(No Model.)
S. DARLING.
MICROMETER GAGE.
No. 289,513. Patented Dec. 4, 1883.
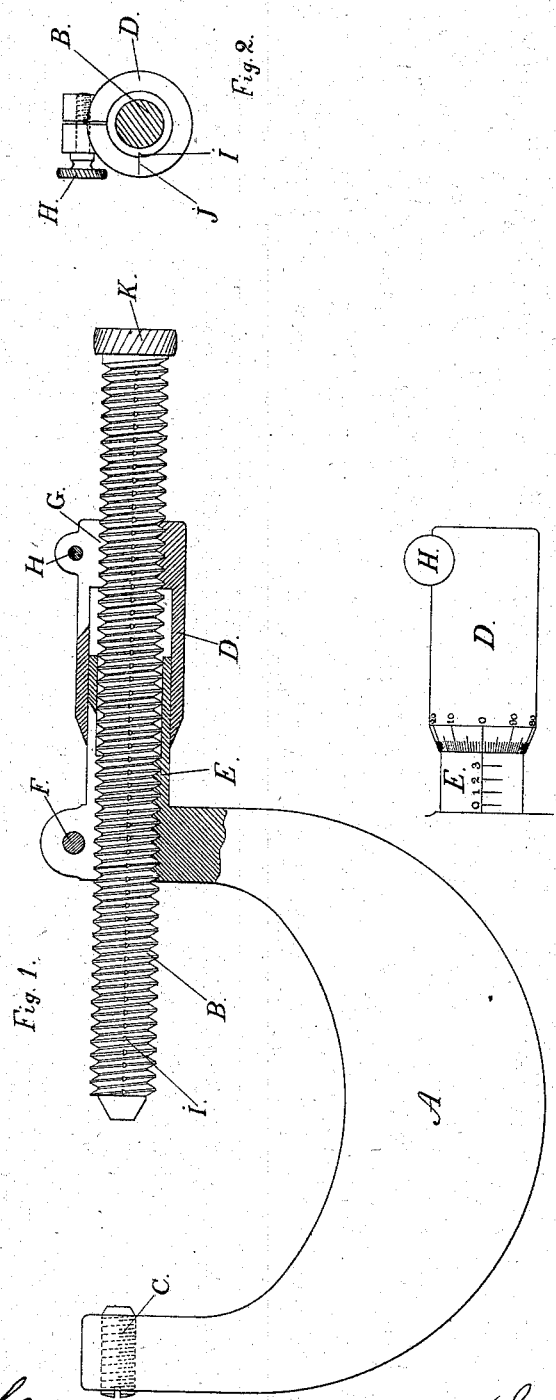
Witnesses:
O. J. Beale.
L. J. Sunstron
Inventor.
Saml. Darling

UNITED STATES PATENT OFFICE.

SAMUEL DARLING, OF PROVIDENCE, RHODE ISLAND.

MICROMETER-GAGE.

SPECIFICATION forming part of Letters Patent No. 289,513, dated December 4, 1883.

Application filed September 8, 1883. (No model.)

*To all whom it may concern:*

Be it known that I, SAMUEL DARLING, a citizen of the United States, residing at Providence, in the county of Providence and State of Rhode Island, have invented a new and useful Improvement in Micrometer-Gages; and I do hereby declare that the following is a full, clear, and exact description of the invention, which will enable others skilled in the art to which it appertains to make and use the same.

The end in view in this invention is to so construct a micrometer-gage that the index-sleeve may be comparatively short—say one inch long, more or less—and be used to indicate correctly on a gage of any desired size and length of screw; and it consists in making the screw movable and adjustable in the sleeve, which will be clearly explained and illustrated in the following specification and drawings.

In the drawings, Figure 1 represents a part sectional view of a gage embracing my improvement; Fig. 2, an end view of the screw and sleeve. Fig. 3 is an outside view of the sleeve D and exterior of the nut E graduated.

A is the frame of the gage; B, the screw; C, the size-adjusting screw; D, the index-sleeve; E, the nut; F, the screw for tightening the nut E; G, the sleeve-nut; H, a screw for tightening the sleeve-nut; I, a groove in the screw, and J an index-mark on the end of the sleeve.

The difference between this gage and any other consists in the screw B being made movable and adjustable in a nut, G, in the sleeve D, by which any size gage and length of screw can be used with as short a sleeve as may be desired down to one-tenth of an inch long, exclusive of the nut. In the drawings, the sleeve is represented as having a motion or run of about one inch; but half that length would doubtless answer a good purpose.

This gage is graduated on the bevel of the sleeve D and exterior of the nut E the same as the common gage now in use, as shown in Fig. 3. The pitch of the screw B being ten to the inch and the sleeve graduated into one hundred parts, each division represents one thousandth of an inch. When an article larger than one inch (or the run of the sleeve) is to be gaged, the tightening-screw H is to be loosened and the screw B turned back through the sleeve-nut G sufficiently to admit the article between the measuring and adjusting screws B and C, and after having adjusted the screw to the sleeve by use of the groove I and index-line J the nut G is tightened by screw H, when the gage is ready for use.

As a guide for the purpose of setting the screw in the right position in the sleeve-nut G, a conical groove, I, is made in the screw parallel with its axis, one side of the groove being made perpendicular to or radial with the axis of the screw, and which will be in line with the index-mark J on the end of the sleeve when the screw is properly adjusted.

In the drawings, the screw is represented in a position to gage a piece from one to two inches thick. To gage a piece three inches thick, the screw would have to be moved back through the sleeve another inch. To gage a piece one inch and less, the screw would have to be run forward one inch.

From the above description it will appear evident that the sleeve D can be used without the nut G by having a smooth hole in the place of the threads of the nut and clamping it on the outside of the screw without departing from the principle of my invention. A milled head, K, is put on the screw for convenience in turning it.

Having described my improvement, I claim—

1. A micrometer-gage having, in combination, a frame, A, provided with a graduated fixed screw-nut, E, a revolving measuring-screw, B, and a graduated sleeve, D, said sleeve being shorter than the measuring capacity of the gage, and arranged to be changed and fastened to different parts of the screw and pass to and fro over the screw-nut E, substantially as described.

2. A micrometer-gage having, in combination, the frame A, measuring-screw B, adjusting-screw C, a graduated sleeve, D, having a nut, G, tightening-screws F and H, groove I, and index-line J, substantially as described, and for the purpose set forth.

SAML. DARLING.

Witnesses:
JACOB KETTNER,
JOHN E. HALL.